(12) United States Patent
Park et al.

(10) Patent No.: US 12,162,967 B2
(45) Date of Patent: Dec. 10, 2024

(54) OLEFIN-BASED POLYMER

(71) Applicant: LG Chem, Ltd., Seoul (KR)

(72) Inventors: Sang Eun Park, Daejeon (KR); Eun Jung Lee, Daejeon (KR); Hyun Jin Ju, Daejeon (KR); In Sung Park, Daejeon (KR); Jin Sam Gong, Daejeon (KR); Jung Ho Jun, Daejeon (KR); Rae Keun Gwak, Daejeon (KR); Choong Hoon Lee, Daejeon (KR); Tae Su Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 551 days.

(21) Appl. No.: 17/418,360

(22) PCT Filed: Feb. 20, 2020

(86) PCT No.: PCT/KR2020/002479
§ 371 (c)(1),
(2) Date: Jun. 25, 2021

(87) PCT Pub. No.: WO2020/171631
PCT Pub. Date: Aug. 27, 2020

(65) Prior Publication Data
US 2022/0049030 A1 Feb. 17, 2022

(30) Foreign Application Priority Data

Feb. 20, 2019 (KR) .......................... 10-2019-0019892

(51) Int. Cl.
| | | |
|---|---|---|
| C08F 210/16 | (2006.01) | |
| C08F 2/01 | (2006.01) | |
| C08F 4/6592 | (2006.01) | |
| C08F 210/06 | (2006.01) | |
| C08F 210/14 | (2006.01) | |

(52) U.S. Cl.
CPC .............. *C08F 210/06* (2013.01); *C08F 2/01* (2013.01); *C08F 4/6592* (2013.01); *C08F 210/14* (2013.01)

(58) Field of Classification Search
CPC .................................................. C08F 210/16
See application file for complete search history.

(56) References Cited

U.S. PATENT DOCUMENTS

| | | | |
|---|---|---|---|
| 6,284,701 B1 | 9/2001 | Yoon et al. | |
| 9,481,747 B2 * | 11/2016 | Park | C08F 4/65904 |
| 10,508,165 B2 * | 12/2019 | Park | C08F 212/08 |
| 11,332,553 B2 * | 5/2022 | Kim | C08F 4/65916 |
| 11,339,235 B2 * | 5/2022 | Park | C08F 4/6592 |
| 11,518,870 B2 * | 12/2022 | Lee | C08F 210/18 |
| 2015/0274874 A1 | 10/2015 | Yoon et al. | |
| 2016/0289359 A1 | 10/2016 | Park | |
| 2018/0201706 A1 | 7/2018 | Park et al. | |
| 2020/0362073 A1 | 11/2020 | Park et al. | |
| 2021/0009793 A1 | 1/2021 | Lee et al. | |

FOREIGN PATENT DOCUMENTS

| | | |
|---|---|---|
| CN | 104250332 A | 12/2014 |
| EP | 3699205 A1 | 8/2020 |
| EP | 3705504 A1 | 9/2020 |
| JP | H08325332 A | 12/1996 |
| JP | 2006265388 A | 10/2006 |
| JP | 2014118515 A | 6/2014 |
| JP | 2015529724 A | 10/2015 |
| JP | 2015532361 A | 11/2015 |
| KR | 100288272 B1 | 5/2001 |
| KR | 20150011211 A | 1/2015 |
| KR | 20150121595 A | 10/2015 |
| KR | 101652920 B1 | 8/2016 |
| KR | 20160115700 A | 10/2016 |
| KR | 20170067499 A | 6/2017 |
| KR | 2019-0078529 A | 7/2019 |
| WO | 2019125050 A1 | 6/2019 |
| WO | 2019132475 A1 | 7/2019 |

OTHER PUBLICATIONS

Extended European Search Report including Written Opinion for Application No. 20759489.6 dated Jan. 4, 2022, pp. 1-8.
International Search Report for Application No. PCT/KR2020/002479, mailed May 26, 2020, 3 pages.

* cited by examiner

*Primary Examiner* — Rip A Lee
(74) *Attorney, Agent, or Firm* — Lerner David LLP

(57) ABSTRACT

An olefin-based polymer and method of making the same is disclosed herein. In some embodiments, the olefin-based polymer has multiple crystallinity and satisfies the following: (1) two or more peaks in a temperature range of −20° C. to 120° C. when measured by cross-fractionation chromatography (CFC), and T(90)−T(50)<8.0° C., (2) a soluble fraction (SF) of 1 wt % or less at −20° C. in CFC, (3) 15° C.<elution temperature (Te)<50° C., and Te has a linear correlation with a density (d) of the polymer, and satisfies the following Equation 1, Te=1,220×d−A, wherein 1,031≤A≤1,039. The olefin-based polymer according to the present invention is an olefin-based polymer having relatively increased the ratio of high crystal regions, and exhibits excellent mechanical properties such as improved tensile strength, tear strength, and flexural modulus.

13 Claims, 2 Drawing Sheets

# OLEFIN-BASED POLYMER

CROSS-REFERENCE TO RELATED APPLICATION

The present application is a national phase entry under U.S.C. § 371 of International Application No. PCT/KR2020/002479, filed on Feb. 20, 2020, which claims priority from Korean Patent Application No. 10-2019-0019892, filed on Feb. 20, 2019, the entire contents of which are incorporated herein by reference.

TECHNICAL FIELD

The present invention relates to an olefin-based polymer, and specifically, to a low-density olefin-based polymer prepared using two types of transition metal compound catalysts, which has a multiple crystallinity and a low Melting Index.

BACKGROUND ART

Polyolefins are widely used for extrusion-molded articles, blow-molded articles and injection-molded articles due to excellent moldability, heat resistance, mechanical properties, hygienic quality, water vapor permeability and appearance characteristics of molded articles thereof. However, polyolefins, particularly polyethylene, have a problem of low compatibility with polar resins such as nylon because of the absence of polar groups in the molecule, and low adhesiveness to polar resins and metals. As a result, it is difficult to blend the polyolefin with polar resins or metals, or to laminate the polyolefin with these materials. Further, a molded article of a polyolefin has a problem of low surface hydrophilicity and a low antistatic property.

In order to solve such a problem and to increase the affinity for a polar material, a method of grafting a polar group-containing monomer onto a polyolefin through radical polymerization has been widely used. However, this method has a problem in that cross-linking in the molecules of the polyolefin and cleavage of molecular chains occur during the grafting reaction, and the viscosity balance of a graft polymer and a polar resin is poor, and thus miscibility is low. There is also a problem in that the appearance characteristics of a molded article are low due to a gel component generated by intramolecular crosslinking or a foreign substance generated by cleavage of molecular chains.

Further, as a method of preparing an olefin polymer such as an ethylene homopolymer, an ethylene/α-olefin copolymer, a propylene homopolymer or a propylene/α-olefin copolymer, a method of copolymerizing a polar monomer in the presence of a metal catalyst such as a titanium catalyst or a vanadium catalyst was used. However, when the above-described metal catalyst is used to copolymerize a polar monomer, there is a problem that the molecular weight distribution or composition distribution is wide, and polymerization activity is low.

As another method, a method of polymerizing in the presence of a metallocene catalyst including a transition metal compound such as zircononocene dichloride and an organoaluminum oxy compound (aluminoxane) is known. When a metallocene catalyst is used, a high-molecular weight olefin polymer is obtained with high activity, and the resulting olefin polymer has a narrow molecular weight distribution and a narrow composition distribution.

Further, as a method of preparing a polyolefin containing a polar group using a metallocene compound having a ligand of a non-crosslinked cyclopentadienyl group, a crosslinked or non-crosslinked bisindenyl group, or an ethylene cross-linked unsubstituted indenyl/fluorenyl group as a catalyst, a method using a metallocene catalyst is also known. However, these methods have a disadvantage in that polymerization activity is very low. For this reason, a method of protecting a polar group by a protecting group is carried out, but there is a problem that the process becomes complicated since a protecting group should be removed again after the reaction when the protecting group is introduced.

An ansa-metallocene compound is an organometallic compound containing two ligands connected to each other by a bridge group, in which the rotation of the ligand is prevented and the activity and structure of the metal center are determined by the bridge group.

The ansa-metallocene compound is used as a catalyst in the preparation of olefin-based homopolymers or copolymers. In particular, it is known that an ansa-metallocene compound containing a cyclopentadienyl-fluorenyl ligand can prepare a high-molecular weight polyethylene, thereby controlling the microstructure of the polypropylene.

Further, it is also known that an ansa-metallocene compound containing an indenyl ligand can produce a polyolefin having excellent activity and improved stereoregularity.

As described above, various studies have been made on ansa-metallocene compounds capable of controlling the microstructure of olefin-based polymers and having higher activity, but the research is still insufficient.

DISCLOSURE

Technical Problem

An object of the present invention is to provide a low-density olefin-based polymer prepared using two types of transition metal compound catalysts, which has a multiple crystallinity and a low Melting Index, and exhibits improved mechanical properties.

Technical Solution

In order to accomplish the object, the present invention provides an olefin-based polymer having multiple crystallinity and satisfies: (1) two peaks in a temperature range of −20° C. to 120° C. when measured by cross-fractionation chromatography (CFC), wherein the two peaks exclude a soluble fraction (SF) at −20° C., and T(90)−T(50)<8.0° C., where T(90) is a temperature at which 90 wt % of the olefin-based polymer is eluted, and T(50) is a temperature at which 50 wt % of the olefin-based polymer is eluted; (2) 10 wt % or less of the SF at −20° C. in CFC; (3) 15° C.<elution temperature(Te)<50° C.; and (4) Te has a linear correlation with the density of the polymer, and satisfies the following Equation 1, $$Te = 1{,}220 \times \text{density} - A \qquad \text{[Equation 1]}$$

wherein 1,031 ≤ A ≤ 1,039.

Advantageous Effects

The olefin-based polymer according to the present invention is a low-density olefin-based polymer having relatively increased the ratio of high crystal regions, and exhibits excellent mechanical properties such as improved tensile strength, tear strength, and flexural modulus.

MODE FOR CARRYING OUT THE INVENTION

Figure 1:
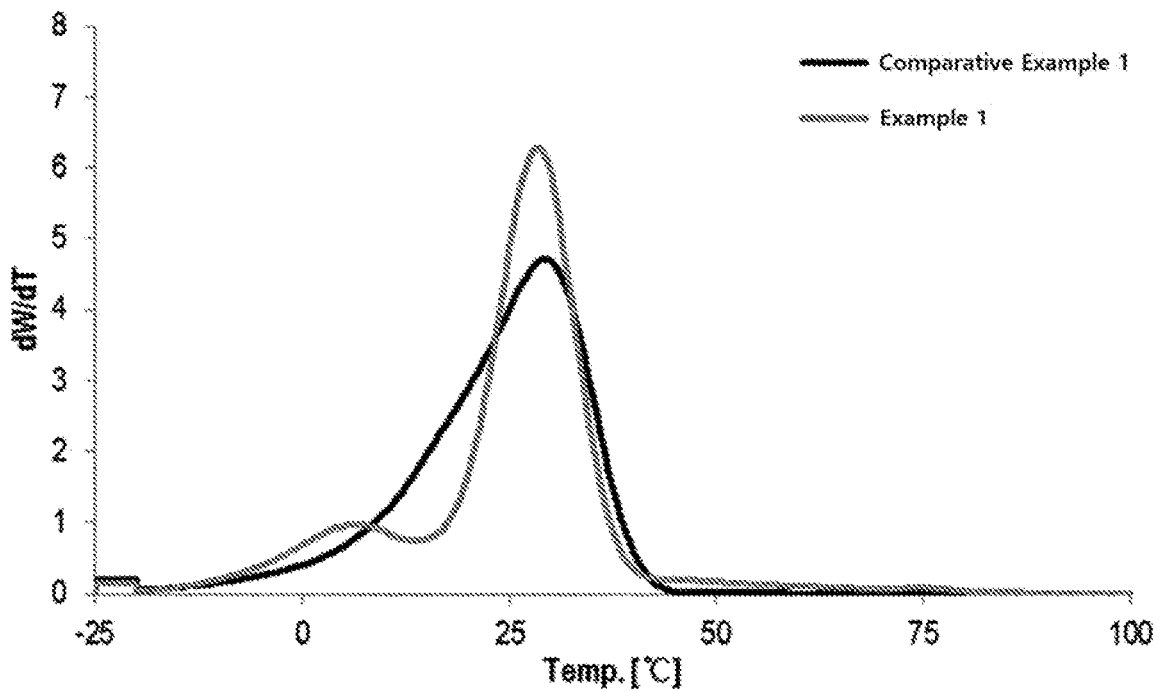
FIG. 1 is a graph shows CFC elution curves of Example 1 and Comparative Example 1.

Hereinafter, the present invention will be described in more detail to assist in the understanding of the present invention.

Terminology used in the specification and claims should not be construed as limited to conventional or literal meanings, and should be construed as having meanings and concepts corresponding to the technical idea of the present invention based on the principle that the inventor can suitably define the concept of a term to explain his own invention in the most preferable way.

In the specification, the term "a polymer" denotes a polymer compound prepared by the polymerization of monomers having the same or different types. The general term "the polymer" includes "a hybrid polymer" as well as "a homopolymer," "a copolymer" and "a terpolymer." Further, "the hybrid polymer" denotes a polymer prepared by the polymerization of at least two different types of monomers. The general term "the hybrid polymer" denotes "the copolymer" (commonly used for denoting a polymer prepared using two different types of monomers) and "the terpolymer" (commonly used for denoting a polymer prepared using three different types of monomers). "The hybrid polymer" includes a polymer prepared by the polymerization of at least four different types of monomers.

An olefin-based polymer according to the present invention has multiple crystallinity and satisfies the following conditions of (1) to (4):

(1) two peaks in a temperature range of −20° C. to 120° C. when measured by cross-fractionation chromatography (CFC), wherein the two peaks exclude a soluble fraction (SF) at −20° C., and T(90)−T(50)<8.0° C., where T(90) is a temperature at which 90 wt % of the olefin-based polymer is eluted, and T(50) is a temperature at which 50 wt % of the olefin-based polymer is eluted;

(2) 10 wt % or less of the SF at −20° C. in CFC;

(3) 15° C.<elution temperature (Te)<50° C.; and (4) Te has a linear correlation with the density of the polymer, and satisfies the following Equation 1.

$$Te = 1{,}220 \times \text{density} - A \quad \text{[Equation 1]}$$

wherein 1,031≤A≤1,039.

(1) two peaks excluding the soluble fraction (SF, Soluble Fraction) at −20° C. in a temperature range of −20° C. to 120° C. when measured by cross-fractionation chromatography (CFC), wherein the two peaks exclude a soluble fraction (SF) at −20° C., and T(90)−T(50)<8.0° C.

wherein T(90) is a temperature at which 90 wt % of the olefin-based polymer is eluted, and T(50) is a temperature at which 50 wt % of the olefin-based polymer is eluted.

An olefin-based polymer according to the present invention has two peaks in a temperature range of −20° C. to 120° C. when taking measurements of cross-fractionation chromatography (CFC), and satisfies that T(90)−T(50) is less than 8° C., which is the difference between T(90) and T(50), wherein T(90) is a temperature at which 90 wt % of the olefin-based polymer is eluted, and T(50) is a temperature at which 50 wt % of the olefin-based polymer is eluted. Specifically, T(90)−T(50) is less than 7.8° C., more specifically, T(90)−T(50) is 1° C. to 7.8° C., even more specifically, T(90)−T(50) is 5° C. to 7.8° C.

In the present invention, CFC may be measured by using a CFC machine of PolymerChar Co. and particularly, may be measured while elevating the temperature from −20° C. to 120° C. using o-dichlorobenzene as a solvent.

Generally, if two or more kinds of olefin-based polymers with different density and crystallinity are respectively prepared in separate reactors, and then blended, two peaks may be shown when taking measurements of temperature rising elution fraction (TREF) or CFC of the composition thus mixed or the olefin block copolymer thereof. On the other hand, in the present invention, crystallinity distribution is controlled widely by a continuous solution polymerization in a single reactor, and two peaks are shown when taking measurements of TREF or CFC in a state where a block is not formed in a polymer, and T(90)−T(50) satisfies the above value, resulting a small difference.

The olefin-based polymer according to an embodiment of the present invention may have T(90) of 20° C. or more, particularly, 20° C. to 60° C., more particularly, 25° C. to 40° C. when taking measurements of TREF or CFC. In addition, the olefin-based polymer according to an embodiment of the present invention may have T(50) of less than 40° C., particularly, 35° C. or less, more particularly, 15° C. to 35° C. when taking measurements of TREF.

In addition, in the present invention, T(50) means the temperature at a point where the elution of 50 wt % of the total elution amount is terminated in a TREF or CFC elution graph expressed by an elution amount with respect to temperature (dC/dT), and T(90) means the temperature at a point where the elution of 90 wt % of the total elution amount is terminated in a CFC elution graph expressed by an elution amount with respect to temperature (dC/dT), and T(90)−T(50) is the difference between T(90) and T(50).

(2) a soluble fraction (SF) of 10 wt % or less at −20° C. in cross-fractionation chromatography (CFC)

Further, the olefin-based polymer according to the present invention may have (2) a soluble fraction (SF) of 10 wt % or less, specifically, in the range of 0.2 wt % to 5 wt %, and more specifically, in the range of 0.2 wt % to 4 wt % at −20° C. in cross-fractionation chromatography (CFC).

The fractions eluted at a low temperature in the cross-fractionation chromatography (CFC) measurement have low crystallinity. In the present specification, the soluble fraction eluted at a temperature of −20° C. or less in the cross-fractionation chromatography (CFC) is defined as an ultra-low crystalline region.

Generally, the lower the density of the polymer, the lower the crystallinity, the ultra-low crystalline region is increased and impact strength is improved. However, in a conventional olefin-based polymer, when the ultra-low crystallinity region exceeds a certain level, mechanical properties are deteriorated. The olefin-based polymer according to the present invention having a multiple crystalline structure has a relatively increased high crystalline content by reducing the ultra-low crystalline content, and exhibits excellent mechanical properties such as improved tensile strength, tear strength, and flexural modulus.

(3) 15° C.<elution temperature (Te)<50° C.

In the present disclosure, Elution temperature (Te) denotes the temperature at the highest point in a TREF or CFC elution graph expressed by an elution amount with respect to temperature (dC/dT).

In addition, for calculating Te, the initiation point of each peak in the graph of elution amount with respect to temperature (dC/dT) may be defined as a point where the elution of a polymer is initiated based on a base line, and the end point of each peak may be defined as a point where the elution of a polymer is terminated based on a base line. When two peaks overlap, and the end point of the previous peak and start point of the following peak cannot be defined based on the base line, the point at which the peak eluting at a relatively low temperature reaches the maximum point and then decreases and then begins to increase again is defined as the end point of the previous peak and the start point of the following peak. In addition, a peak expressed in −20° C. to −10° C. may be regarded as a portion of a peak expressed in after −10° C., which is shown in this position due to the limitation of measurement. Accordingly, the peak expressed in this position may be included and treated as a peak expressed in after −10° C.

In the present disclosure, a single crystallinity denotes having one peak excluding the soluble fraction (SF, Soluble Fraction) at −20° C., and a multiple crystallinity denotes having two or more peaks excluding the soluble fraction (SF, Soluble Fraction) at −20° C. in a elution graph expressed by an elution amount with respect to temperature (dC/dT). In addition, in the present disclosure, when the polymer has a multiple crystallinity, Elution temperature (Te) is the temperature at the highest point in a CFC elution graph expressed by an elution amount with respect to temperature (dC/dT), that is, only the peak of the larger peak is used as Te.

The olefin-based polymer according to the present invention satisfies 15° C.<elution temperature (Te)<50° C., and specifically, may satisfy 15° C.≤Te≤40° C., and more specifically, 20° C.≤Te≤40° C.

(4) Te has a linear correlation with the density of the polymer, and satisfies the following Equation 1.

Te has a linear correlation with the density of the polymer, and satisfies the following Equation 1:

$$Te = 1{,}220 \times density - A \qquad \text{[Equation 1]}$$

In Equation 1, A satisfies in a range of 1,031≤A≤1,039.

The olefin-based polymer according to the present invention may further satisfy (5) a density (d) of 0.860 g/cc to 0.890 g/cc when measured in accordance with ASTM D-792, specifically, 0.865 g/cc to 0.890 g/cc, and more specifically, 0.865 g/cc to 0.880 g/cc.

In addition, the olefin-based polymer according to the present invention may further satisfy (6) a melt index (MI, 190° C., 2.16 kg load conditions) of 0.1 dg/min to 10.0 dg/min, specifically, 0.1 dg/min to 8.0 dg/min, and more specifically, 0.1 dg/min to 5.0 dg/min.

The melting index (MI) may be controlled by adjusting the amount used of a catalyst during a polymerization process, and may influence a mechanical properties, impact strength and moldability of an olefin-based polymer.

In addition, the olefin-based polymer according to the present invention may further satisfy (7) a weight average molecular weight (Mw) of 70,000 g/mol to 500,000 g/mol, specifically, 70,000 g/mol to 300,000 g/mol, and more specifically, 70,000 g/mol to 200,000 g/mol.

Further, the olefin-based polymer according to an embodiment of the present invention may satisfy (8) a molecular weight distribution (MWD), which is a ratio (Mw/Mn) of a weight average molecular weight (Mw) to a number average molecular weight (Mn), in the range of 1.0 to 3.0, specifically in the range of 1.5 to 2.8, and more specifically in the range of 1.8 to 2.6. The olefin-based polymer according to an embodiment of the present invention may be polymerized using a catalyst composition including two types of transition metal compounds having a characteristic structure, thereby exhibiting a narrow molecular weight distribution.

In addition, the olefin-based polymer according to an embodiment of the present invention has one monomodal-type peak in a molecular weight distribution curve. The olefin-based polymer of the present invention is polymerized using a catalyst composition containing two types of transition metal compounds, and as a result, has the molecular weight distribution of single distribution, while having multiple crystallinity.

Generally, the density of the olefin-based polymer is affected by the type and content of the monomers used in the polymerization, the degree of polymerization and the like, and the copolymer is affected by the content of the comonomer. The olefin-based polymer of the present invention is polymerized using a catalyst composition containing two types of transition metal compounds having a characteristic structure, and a large amount of comonomers may be introduced, and the olefin-based polymer of the present invention has a low density in the range as described above.

The olefin-based polymer may have (9) a melt temperature (Tm) of 100° C. or less, specifically of 80° C. or less, and more specifically in the range of 10° C. to 70° C. obtained in a differential scanning calorimetry (DSC) curve obtained by DSC measurement.

The olefin-based polymer is a homopolymer of any one selected from an olefin-based monomer, specifically, an alpha-olefin-based monomer, a cyclic olefin-based monomer, a diene olefin-based monomer, a triene olefin-based monomer, and a styrene-based monomer, or a copolymer of two or more selected them. More specifically, the olefin-based polymer may be a copolymer of ethylene and an alpha-olefin having 3 to 12 carbon atoms or 3 to 10 carbon atoms, even more specifically, a copolymer of ethylene and 1-octene.

The alpha-olefin comonomer may include any one or a mixture of two or more selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidene norbornene, phenyl norbornene, vinyl norbornene, dicyclopentadiene, 1,4-butadiene, 1,5-pentadiene, 1,6-hexadiene, styrene, alpha-methylstyrene, divinylbenzene and 3-chloromethyl styrene.

More specifically, the olefin copolymer according to an embodiment of the present invention may be a copolymer of ethylene and propylene, ethylene and 1-butene, ethylene and 1-hexene, ethylene and 4-methyl-1-pentene or ethylene and 1-octene, and more specifically, the olefin copolymer according to an embodiment of the present invention may be a copolymer of ethylene and 1-octene.

When the olefin-based polymer is a copolymer of ethylene and an alpha-olefin, the amount of the alpha-olefin may be 90 wt % or less, more specifically 70 wt % or less, still more specifically in the range of 5 wt % to 60 wt % and even more specifically in the range of 20 wt % to 50 wt % with respect to the total weight of the copolymer. When the alpha-olefin is included in the above-described range, it is easy to realize the above-mentioned physical properties.

The olefin-based polymer according to an embodiment of the present invention, which has the above-described physical properties and constitutional characteristics may be prepared by a continuous solution polymerization reaction in the presence of a metallocene catalyst composition including at least one type of a transition metal compound in a single reactor. Accordingly, in the olefin-based polymer according to an embodiment of the present invention, a block formed by linearly connecting two or more repeating units derived from one monomer among monomers constituting a polymer in the polymer is not formed. That is, the olefin-based polymer according to the present invention does not include a block copolymer, but may be selected from the group consisting of a random copolymer, an alternating copolymer and a graft copolymer, more particularly, may be a random copolymer.

Specifically, the olefin-based copolymer of the present invention may be obtained by a preparation method including a step of polymerizing olefin-based monomers in the presence of a catalyst composition for olefin polymerization including a transition metal compound represented by the following Formula 1 and a transition metal compound represented by the following Formula 2 in an molar ratio of 1:5 to 1:10, specifically, of 1:5 to 1:7.

However, in the preparation of an olefin-based polymer according to an embodiment of the present invention, the structure ranges of the first transition metal compound and the second transition metal compound are not limited to specifically disclosed types, and all modifications, equivalents, or replacements included in the scope and technical range of the present invention should be understood to be included in the present invention.

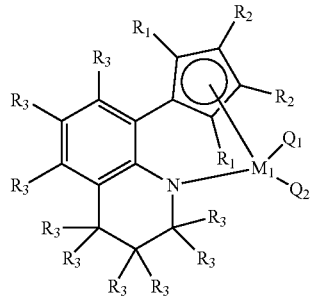

[Formula 1]

In Formula 1, $R_1$ may be the same or different, and each independently represent hydrogen, an alkyl having 1 to 20 carbon atoms, an alkenyl having 2 to 20 carbon atoms, an aryl, a silyl, an alkylaryl, an arylalkyl or a metalloid radical of a Group 4 metal substituted with a hydrocarbyl, and the two $R_1$ may be connected together by alkylidene radicals including an alkyl having 1 to 20 carbon atoms or an aryl radical having 6 to 20 carbon atoms to form a ring;

$R_2$ may be the same or different, and each independently represent hydrogen; a halogen; an alkyl having 1 to 20 carbon atoms; an aryl; an alkoxy; an aryloxy; or an amido radical, and two or more of the $R_2$ may be connected to each other to form an aliphatic ring or an aromatic ring;

$R_3$ may be the same or different, and each independently represent hydrogen; a halogen; an alkyl having 1 to 20 carbon atoms; or an aliphatic or aromatic ring which contains nitrogen and is substituted with an aryl radical or unsubstituted, and when the number of substituents is plural, two or more substituents among the substituents may be connected to each other to form an aliphatic or aromatic ring;

$M_1$ is a Group 4 transition metal;

$Q_1$ and $Q_2$ each independently represent a halogen; an alkyl having 1 to 20 carbon atoms; an alkenyl; an aryl; an alkylaryl; an arylalkyl; an alkylamido having 1 to 20 carbon atoms; an arylamido; or an alkylidene radical having 1 to 20 carbon atoms;

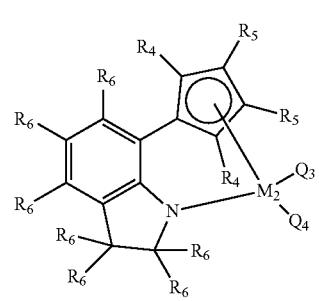

[Formula 2]

In Formula 2, $R_4$ may be the same or different, and each independently represent hydrogen, an alkyl having 1 to 20 carbon atoms, an alkenyl having 2 to 20 carbon atoms, an aryl, a silyl, an alkylaryl, an arylalkyl or a metalloid radical of a Group 4 metal substituted with a hydrocarbyl, and the two $R_4$ may be connected together by alkylidene radicals including an alkyl having 1 to 20 carbon atoms or an aryl radical having 6 to 20 carbon atoms to form a ring;

$R_5$ may be the same or different, and each independently represent hydrogen; a halogen; an alkyl having 1 to 20 carbon atoms; an aryl; an alkoxy; an aryloxy; or an amido radical, and two or more of the $R_5$ may be connected to each other to form an aliphatic ring or an aromatic ring;

$R_6$ may be the same or different, and each independently represent hydrogen; a halogen; an alkyl having 1 to 20 carbon atoms; or an aliphatic or aromatic ring which contains nitrogen and is substituted with an aryl radical or unsubstituted, and when the number of substituents is plural, two or more substituents among the substituents may be connected to each other to form an aliphatic or aromatic ring;

$M_2$ is a Group 4 transition metal;

$Q_3$ and $Q_4$ each independently represent a halogen; an alkyl having 1 to 20 carbon atoms; an alkenyl; an aryl; an alkylaryl; an arylalkyl; an alkylamido having 1 to 20 carbon atoms; an arylamido; or an alkylidene radical having 1 to 20 carbon atoms.

Further, in another embodiment of the present invention, in Formula 1, $R_1$ and $R_2$ may be the same or different, and each independently may represent hydrogen; an alkyl having 1 to 20 carbon atoms; an aryl; or a silyl, $R_3$ may be the same or different, and may be an alkyl having 1 to 20 carbon atoms; an alkenyl having 2 to 20 carbon atoms; an aryl; an alkylaryl; an arylalkyl; an alkoxy having 1 to 20 carbon atoms; an aryloxy; or an amido; and two or more adjacent $R_3$ among the $R_3$ may be connected to each other to form an aliphatic or aromatic ring;

$Q_1$ and $Q_2$ may be the same or different, and each may independently represent a halogen; an alkyl having 1 to 20 carbon atoms; an alkylamido having 1 to 20 carbon atoms; or an arylamido, $M_1$ may be a Group 4 transition metal.

Further, in Formula 2, $R_4$ and $R_5$ may be the same or different, and each may independently represent hydrogen; an alkyl having 1 to 20 carbon atoms; an aryl; or a silyl, $R_6$ may be the same or different, and may be an alkyl having 1 to 20 carbon atoms; an alkenyl having 2 to 20 carbon atoms; an aryl; an alkylaryl; an arylalkyl; an alkoxy having 1 to 20 carbon atoms; an aryloxy; or an amido; and two or more $R_6$ among the $R_6$ may be connected to each other to form an aliphatic or aromatic ring;

$Q_3$ and $Q_4$ may be the same or different, and each may independently represent a halogen; an alkyl having 1 to 20 carbon atoms; an alkylamido having 1 to 20 carbon atoms; or an arylamido, $M_2$ may be a Group 4 transition metal.

Further, in the transition metal compound represented by Formula 1 or Formula 2, a metal site is connected by a cyclopentadienyl ligand to which tetrahydroquinoline is introduced, and the structure thereof has a narrow Cp-M-N angle and a wide $Q_1$-M-$Q_2$ ($Q_3$-M-$Q_4$) angle to which a monomer approaches. In addition, Cp, tetrahydroquinoline, nitrogen and the metal site are connected in order via the bonding of a ring shape to form a more stable and rigid pentagonal ring structure. Therefore, when these compounds are activated by reacting with a cocatalyst such as methylaluminoxane or $B(C_6F_5)_3$ and then applied to olefin polymerization, an olefin-based polymer having characteristics such as high activity, high molecular weight, high copolymerization properties and the like may be polymerized even at a high polymerization temperature.

Each of the substituents defined in the present specification will be described in detail as follows.

In the present specification, unless particularly defined otherwise, a hydrocarbyl group means a monovalent hydrocarbon group having 1 to 20 carbon atoms formed only with carbon and hydrogen regardless of its structure such as an alkyl group, an aryl group, an alkenyl group, an alkinyl group, a cycloalkyl group, an alkylaryl group and an arylalkyl group.

The term "halogen" used in the present specification, unless otherwise specified, refers to fluorine, chlorine, bromine and iodine.

The term "alkyl" used in the present specification, unless otherwise specified, refers to a linear or branched hydrocarbon residue.

The term "alkenyl" used in the present specification, unless otherwise specified, refers to a linear or branched alkenyl group.

The branched chain may be an alkyl having 1 to 20 carbon atoms; an alkenyl having 2 to 20 carbon atoms; an aryl having 6 to 20 carbon atoms; an alkylaryl having 7 to 20 carbon atoms; or an arylalkyl having 7 to 20 carbon atoms.

According to an embodiment of the present invention, the aryl group preferably has 6 to 20 carbon atoms, and specifically includes phenyl, naphthyl, anthracenyl, pyridyl, dimethylanilinyl, anisolyl and the like, but is not limited thereto.

The alkylaryl group refers to an aryl group substituted with the alkyl group.

The arylalkyl group refers to an alkyl group substituted with the aryl group.

The ring (or a heterocyclic group) refers to a monovalent aliphatic or aromatic hydrocarbon group which has ring atoms with 5 to 20 carbon atoms and contains one or more heteroatoms, and may be a single ring or a condensed ring of two or more rings. Further, the heterocyclic group may be unsubstituted or substituted with an alkyl group. Examples thereof include indoline, tetrahydroquinoline and the like, but the present invention is not limited thereto.

The alkylamino group refers to an amino group substituted with the alkyl group, and includes a dimethylamino group, a diethylamino group and the like, but is not limited thereto.

According to an embodiment of the present invention, the aryl group preferably has 6 to 20 carbon atoms, and specifically includes phenyl, naphthyl, anthracenyl, pyridyl, dimethylanilinyl, anisolyl and the like, but is not limited thereto.

The compound of Formula 1 may be one or more selected from the group consisting of the following Formulae 1-1 and 1-2, and the compound of Formula 2 may be the following Formula 2-1, but the present invention is not limited thereto.

[Formula 1-1]

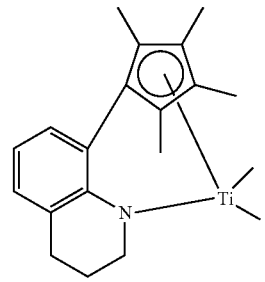

[Formula 1-2]

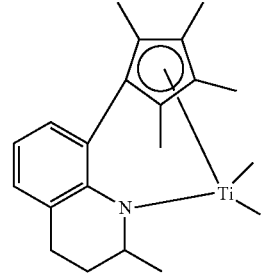

[Formula 2-1]

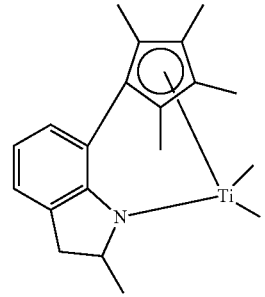

In addition, it may be a compound having various structures within the ranges defined in Formulae 1 and 2.

The transition metal compound of Formula 1 and the transition metal compound of Formula 2 allow introduction of a large amount of an alpha-olefin as well as low-density polyethylene due to the structural characteristics of the catalyst, and thus it is possible to prepare a low-density polyolefin copolymer having a density in the range of 0.850 g/cc to 0.865 g/cc. Further, when the transition metal compound of Formula 1 and the transition metal compound of Formula 2 are used together in an molar ratio of 1:1 to 1:5, and specifically of 1:1 to 1:4, an olefin-based polymer having a high molecular weight, a narrow molecular weight distribution, a low density and a low hardness may be prepared.

For example, the transition metal compounds of Formulae 1 and 2 may be prepared by the following method.

In Reaction Scheme 1, $R_1$ to $R_3$, $M_1$, $Q_1$ and $Q_2$ each are as defined in Formula 1.

Further, the transition metal compound of Formula 2 may be prepared by the following method as an example.

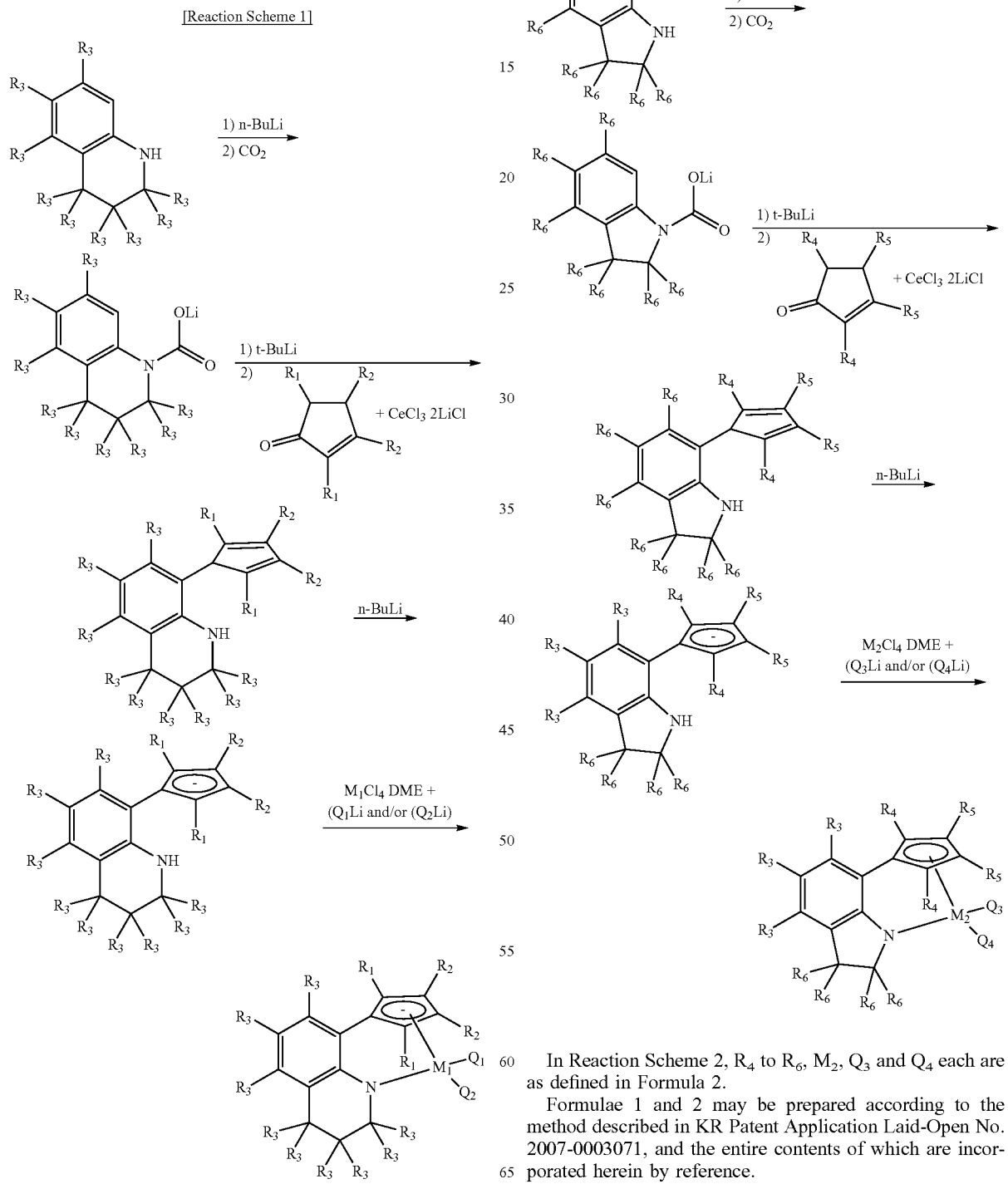

In Reaction Scheme 2, $R_4$ to $R_6$, $M_2$, $Q_3$ and $Q_4$ each are as defined in Formula 2.

Formulae 1 and 2 may be prepared according to the method described in KR Patent Application Laid-Open No. 2007-0003071, and the entire contents of which are incorporated herein by reference.

The transition metal compound of Formula 1 and the transition metal compound of Formula 2 may be used alone or in combination including one or more cocatalyst compounds represented by the following Formula 3, Formula 4 and Formula 5 in addition to the transition metal compound of Formula 1 and the transition metal compound of Formula 2 as a catalyst for the polymerization reaction.

—[Al(R$_7$)—O]$_a$— [Formula 3]

A(R$_7$)$_3$ [Formula 4]

[L-H]$^+$[W(D)$_4$]$^-$ or [L]$^+$[W(D)$_4$]$^-$ [Formula 5]

In Formulae 3 to 5,

R$_7$ may be the same or different, and are each independently selected from the group consisting of a halogen, a hydrocarbyl having 1 to 20 carbon atoms, and a hydrocarbyl having 1 to 20 carbon atoms substituted with a halogen, A is aluminum or boron, D each independently represents an aryl having 6 to 20 carbon atoms or an alkyl having 1 to 20 carbon atoms in which at least one hydrogen atom may be substituted with a substituent selected from the group consisting of a halogen, a hydrocarbon having 1 to 20 carbon atoms, an alkoxy having 1 to 20 carbon atoms and an aryloxy having 6 to 20 carbon atoms, H is a hydrogen atom, L is a neutral or cationic Lewis acid, W is a Group 13 element, and a is an integer of 2 or more.

Examples of the compound represented by Formula 3 include alkylaluminoxanes such as methylaluminoxane (MAO), ethylaluminoxane, isobutylaluminoxane, butylaluminoxane and the like, and modified alkyl aluminoxanes having two or more of the alkylaluminoxanes mixed therein, and specifically may be methyl aluminoxane and modified methyl aluminoxane (MMAO).

Examples of the compound represented by Formula 4 include trimethylaluminum, triethylaluminum, triisobutylaluminum, tripropylaluminum, tributylaluminum, dimethylchloroaluminum, tri-iso-propyl aluminum, tri-sec-butyl aluminum, tricyclopentyl aluminum, tripentyl aluminum, triisopentyl aluminum, trihexyl aluminum, trioctyl aluminum, ethyldimethyl aluminum, methyldiethyl aluminum, triphenyl aluminum, tri-p-tolyl aluminum, dimethyl aluminum methoxide, dimethyl aluminum ethoxide, trimethyl boron, triethyl boron, triisobutyl boron, tripropyl boron, tributyl boron and the like, and specifically, may be selected from trimethyl aluminum, triethyl aluminum and triisobutyl aluminum.

Examples of the compound represented by Formula 5 include triethylammonium tetraphenylboron, tributylammonium tetraphenylboron, trimethylammonium tetraphenylboron, tripropylammonium tetraphenylboron, trimethylammonium tetra(p-tolyl) boron, trimethylammonium tetra(o,p-dimethylphenyl) boron, tributylammonium tetra(p-trifluoromethylphenyl) boron, trimethylammonium tetra(p-trifluoromethylphenyl) boron, tributylammonium tetrapentafluorophenylboron, N,N-diethylanilinium tetraphenylboron, N,N-diethylanilinium tetrapentafluorophenylboron, diethylammonium tetrapentafluorophenylboron, triphenylphosphonium tetraphenylboron, trimethylphosphonium tetraphenylboron, dimethylanilinium tetrakis(pentafluorophenyl) borate, triethylammonium tetraphenyl aluminum, tributylammonium tetraphenyl aluminum, trimethylammonium tetraphenyl aluminum, tripropylammonium tetraphenyl aluminum, trimethylammonium tetra(p-tolyl) aluminum, tripropylammonium tetra(p-tolyl) aluminum, triethylammoniumtetra (o,p-dimethylphenyl) aluminum, tributylammonium tetra(p-trifluoromethylphenyl) aluminum, trimethylammonium tetra(p-trifluoromethylphenyl) aluminum, tributylammonium tetrapentafluorophenyl aluminum, N,N-diethylanilinium tetraphenyl aluminum, N,N-diethylanilinium tetrapentafluorophenyl aluminum, diethylammonium tetrapentafluorophenyl aluminum, triphenylphosphonium tetraphenyl aluminum, trimethylphosphonium tetraphenyl aluminum, tripropylammonium tetra(p-tolyl) boron, triethylammonium tetra(o,p-dimethylphenyl) boron, triphenylcarbonium tetra(p-trifluoromethylphenyl) boron, triphenylcarbonium tetrapentafluorophenylboron and the like.

The catalyst composition may be prepared by a method including the steps of 1) bringing a primary mixture of a transition metal compound represented by Formula 1 and a transition metal compound represented by Formula 2 into contact with a compound represented by Formula 3 or 4 to obtain a mixture; and 2) adding a compound represented by Formula 5 to the mixture, as the first method.

Further, the catalyst composition may be prepared by a method of bringing a transition metal compound represented by Formula 1 and a transition metal compound represented by Formula 2 into contact with a compound represented by Formula 3, as the second method.

In the first method among the above-described preparation methods of the catalyst composition, the molar ratio of the transition metal compound represented by Formula 1 and the transition metal compound represented by Formula 2/the compound represented by Formula 3 or 4 may be in the range of 1/5,000 to 1/2, specifically in the range of 1/1000 to 1/10, and more specifically in the range of 1/500 to 1/20. When the molar ratio of the transition metal compound represented by Formula 1 and the transition metal compound represented by Formula 2/the compound represented by Formula 3 or 4 exceeds 1/2, the amount of the alkylating agent is very small, and thus the alkylation of the metal compound is not fully carried out. When the molar ratio is less than 1/5000, the alkylation of the metal compound is carried out, but the activation of the alkylated metal compound is not fully achieved due to the side reaction between the remaining excess alkylating agent and the activating agent which is a compound of Formula 5. Further, the molar ratio of the transition metal compound represented by Formula 1 and the transition metal compound represented by Formula 2/the compound represented by Formula 5 may be in the range of 1/25 to 1, specifically in the range of 1/10 to 1, and more specifically in the range of 1/5 to 1. When the molar ratio of the transition metal compound represented by Formula 1 and the transition metal compound represented by Formula 2/the compound represented by Formula 5 is more than 1, the amount of the activator is relatively small, so that the metal compound is not fully activated, and thus the activity of the resulting catalyst composition may be lowered. When the molar ratio is less than 1/25, the activation of the metal compound is fully performed, but the unit cost of the catalyst composition may not be economical due to the remaining excess activator, or the purity of the produced polymer may be lowered.

In the second method among the above-described preparation methods of the catalyst composition, the molar ratio of the transition metal compound represented by Formula 1 and the transition metal compound represented by Formula 2/the compound represented by Formula 3 may be in the range of 1/10,000 to 1/10, and specifically in the range of 1/5000 to 1/100, and more specifically in the range of 1/3000 to 1/500. When the molar ratio is more than 1/10, the amount of the activator is relatively small, so that the activation of the metal compound is not fully achieved, and thus the activity of the resulting catalyst composition may be lowered. When the molar ratio is less than 1/10,000, the activation of the metal compound is fully performed, but the unit cost of the catalyst composition may not be economical due to the remaining excess activator, or the purity of the produced polymer may be lowered.

In the preparation of the catalyst composition, a hydrocarbon-based solvent such as pentane, hexane, heptane or the like, or an aromatic solvent such as benzene, toluene or the like may be used as a reaction solvent.

Further, the catalyst composition may include the transition metal compound and a cocatalyst compound in the form of being supported on a carrier.

The carrier may be used without any particular limitation as long as it is used as a carrier in a metallocene catalyst. Specifically, the carrier may be silica, silica-alumina, silica-magnesia or the like, and any one or a mixture of two or more thereof may be used.

In the case where the support is silica, there are few catalysts liberated from the surface during the olefin polymerization process since the silica carrier and the functional groups of the metallocene compound of Formula 1 form a chemical bond. As a result, it is possible to prevent the occurrence of fouling of the wall surface of the reactor or the polymer particles entangled with each other during the preparation process of the olefin-based polymer. Further, the olefin-based polymer prepared in the presence of the catalyst containing the silica carrier has an excellent particle shape and apparent density of the polymer.

More specifically, the carrier may be high-temperature dried silica or silica-alumina containing a siloxane group having high reactivity on the surface through a method such as high-temperature drying.

The carrier may further include an oxide, carbonate, sulfate or nitrate component such as $Na_2O$, $K_2CO_3$, $BaSO_4$, $Mg(NO_3)_2$ or the like.

The polymerization reaction for polymerizing the olefin-based monomer may be carried out by a conventional process applied to the polymerization of olefin monomers such as continuous solution polymerization, bulk polymerization, suspension polymerization, slurry polymerization, emulsion polymerization or the like.

The polymerization reaction of olefin monomers may be carried out in the presence of an inert solvent, and examples of the inert solvent include benzene, toluene, xylene, cumene, heptane, cyclohexane, methylcyclohexane, methylcyclopentane, n-hexane, 1-hexene and 1-octene, but the present invention is not limited thereto.

The polymerization of the olefin-based polymer may be carried out at a temperature of from about 25° C. to about 500° C. and the reaction pressure of from about 1 to 100 $kgf/cm^2$.

Specifically, the polymerization of the olefin-based polymer may be carried out at a temperature in the range of about 25° C. to about 500° C., particularly, in the range of 80° C. to 250° C., and more particularly in the range of 100° C. to 200° C. Further, the reaction pressure at the time of polymerization may be in the range of 1 $kgf/cm^2$ to 150 $kgf/cm^2$, preferably 1 $kgf/cm^2$ to 120 $kgf/cm^2$, and more preferably 5 $kgf/cm^2$ to 100 $kgf/cm^2$.

Due to having improved physical properties, the olefin-based polymer of the present invention may be used for blow molding, extrusion molding or injection molding in diverse fields and uses including wrapping, construction, daily supplies, or the like, such as a material of an automobile, a wire, a toy, a fiber, a medicine, or the like. Particularly, the olefin-based polymer may be used for an automobile which requires excellent impact strength.

Further, the olefin-based polymer of the present invention may be usefully used in the production of molded articles.

The molded article may particularly include a blow molded article, an inflation molded article, a cast molded article, an extrusion laminate molded article, an extrusion molded article, a foamed molded article, an injection molded article, a sheet, a film, a fiber, a monofilament, a non-woven fabric, or the like.

MODE FOR CARRYING OUT THE INVENTION

Examples

Hereinafter, the present invention will be explained in particular with reference to the following examples. However, the following examples are illustrated to assist the understanding of the present invention, and the scope of the present invention is not limited thereto.

Preparation Example 1: Preparation of Transition Metal Compound 1

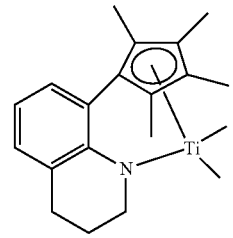

(1) Preparation of 8-(2,3,4,5-tetramethyl-1,3-cyclopentadienyl)-1,2,3,4-tetrahydroquinoline (i) Preparation of Lithium Carbamate 1,2,3,4-tetrahydroquinoline (13.08 g, 98.24 mmol) and diethyl ether (150 mL) were put into a Schlenk flask. The above-described Schlenk flask was immersed in a low-temperature bath at −78° C. formed of dry ice and acetone, and stirred for 30 minutes. Subsequently, n-BuLi (39.3 mL, 2.5 M, 98.24 mmol) was added thereto via syringe under a nitrogen atmosphere, and thereby pale yellow slurry was formed. Then, after the flask was stirred for 2 hours, the temperature of the flask was raised to room temperature while removing the produced butane gas. The flask was immersed again in a low-temperature bath at −78° C. to lower a temperature, and then $CO_2$ gas was introduced thereto. As carbon dioxide gas was introduced, the slurry disappeared and the solution became clear. The flask was connected to a bubbler to remove the carbon dioxide gas, and the temperature was raised to room temperature. Thereafter, an excess amount of $CO_2$ gas and a solvent were removed under vacuum. The flask was transferred to a dry box, and pentane was added thereto, followed by vigorous stirring and filtration to obtain lithium carbamate which is a white solid compound. The white solid compound is coordinated with diethyl ether. The yield is 100%.

$^1$H NMR ($C_6D_6$, $C_5D_5N$): δ 1.90 (t, J=7.2 Hz, 6H, ether), 1.50 (br s, 2H, quin-$CH_2$), 2.34 (br s, 2H, quin-$CH_2$), 3.25

(q, J=7.2 Hz, 4H, ether), 3.87 (br s, 2H, quin-CH$_2$), 6.76 (br d, J=5.6 Hz, 1H, quin-CH) ppm $^{13}$C NMR (C$_6$D$_6$): δ 24.24, 28.54, 45.37, 65.95, 121.17, 125.34, 125.57, 142.04, 163.09 (C=O) ppm (ii) Preparation of 8-(2,3,4,5-tetramethyl-1,3-cyclopentadienyl)-1,2,3,4-tetrahydroquinoline

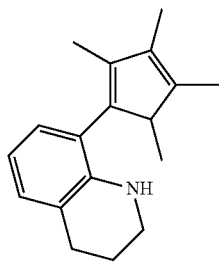 [SMILES: CC1=C(C)C(C)C(c2cccc3c2NCCC3)=C1C]

The lithium carbamate compound prepared in Step (i) (8.47 g, 42.60 mmol) was put into a Schlenk flask. Then, tetrahydrofuran (4.6 g, 63.9 mmol) and 45 mL of diethyl ether were added in sequence. The Schlenk flask was immersed in a low-temperature bath at −20° C. including acetone and a small amount of dry ice and stirred for 30 minutes, and then t-BuLi (25.1 mL, 1.7 M, 42.60 mmol) was added. At this time, the color of the reaction mixture turned red. The mixture was stirred for 6 hours while a temperature was maintained at −20° C. A CeCl$_3$·2LiCl solution (129 mL, 0.33 M, 42.60 mmol) dissolved in tetrahydrofuran and tetramethylcyclopentinone (5.89 g, 42.60 mmol) were mixed in a syringe, and then introduced into the flask under a nitrogen atmosphere. The temperature of the flask was slowly raised to room temperature. After 1 hour, a thermostat was removed and the temperature was maintained at room temperature. Subsequently, water (15 mL) was added to the flask, and ethyl acetate was added thereto, followed by filtration to obtain a filtrate. The filtrate was transferred to a separatory funnel, followed by the addition of hydrochloric acid (2 N and 80 mL) and shaking for 12 minutes. A saturated aqueous solution of sodium hydrogencarbonate (160 mL) was added for neutralization, and then an organic layer was extracted. Anhydrous magnesium sulfate was added to the organic layer to remove moisture, followed by filtration, and the filtrate was taken to remove the solvent. The obtained filtrate was purified by column chromatography using hexane and ethyl acetate (v/v, 10:1) to obtain yellow oil. The yield was 40%.

$^1$H NMR (C$_6$D$_6$): δ 1.00 (br d, 3H, Cp-CH$_3$), 1.63-1.73 (m, 2H, quin-CH$_2$), 1.80 (s, 3H, Cp-CH$_3$), 1.81 (s, 3H, Cp-CH$_3$), 1.85 (s, 3H, Cp-CH$_3$), 2.64 (t, J=6.0 Hz, 2H, quin-CH$_2$), 2.84-2.90 (br, 2H, quin-CH$_2$), 3.06 (br s, 1H, Cp-H), 3.76 (br s, 1H, N—H), 6.77 (t, J=7.2 Hz, 1H, quin-CH), 6.92 (d, J=2.4 Hz, 1H, quin-CH), 6.94 (d, J=2.4 Hz, 1H, quin-CH) ppm (2) Preparation of [(1,2,3,4-tetrahydroquinolin-8-yl) tetramethylcyclopentadienyl-η$^5$, κ-N]titanium dimethyl)

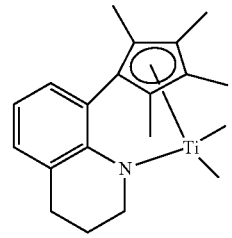

(i) Preparation of [(1,2,3,4-tetrahydroquinolin-8-yl) tetramethylcyclopentadienyl-η$^5$, κ-N]dilithium compound After 8-(2,3,4,5-tetramethyl-1,3-cyclopentadienyl)-1,2,3,4-tetrahydroquinoline (8.07 g, 32.0 mmol) prepared by Step (1) and 140 mL of diethyl ether were put in a round flask in a dry box, a temperature was lowered to −30° C. and n-BuLi (17.7 g, 2.5 M, 64.0 mmol) was slowly added while stirring. The reaction was allowed to proceed for 6 hours while the temperature was raised to room temperature. Thereafter, the solid was obtained by filtration while washing with diethyl ether several times. A vacuum was applied to remove the remaining solvent to obtain a di-lithium compound (9.83 g) which is a yellow solid. The yield was 95%.

$^1$H NMR (C$_6$D$_6$, C$_5$D$_5$N): δ 2.38 (br s, 2H, quin-CH$_2$), 2.53 (br s, 12H, Cp-CH$_3$), 3.48 (br s, 2H, quin-CH$_2$), 4.19 (br s, 2H, quin-CH$_2$), 6.77 (t, J=6.8 Hz, 2H, quin-CH), 7.28 (br s, 1H, quin-CH), 7.75 (brs, 1H, quin-CH) ppm (ii) Preparation of (1,2,3,4-tetrahydroquinolin-8-yl) tetramethylcyclopentadienyl-η$^5$, κ-N]titanium dimethyl In a dry box, TiCl$_4$·DME (4.41 g, 15.76 mmol) and diethyl ether (150 mL) were put into a round flask and MeLi (21.7 mL, 31.52 mmol and 1.4 M) was slowly added while stirring at −30° C. After stirring for 15 minutes, [(1,2,3,4-tetrahydroquinolin-8-yl)tetramethylcyclopentadienyl-η$^5$, κ-N]dilithium compound (5.30 g, 15.76 mmol) prepared in Step (i) was put into the flask. The mixture was stirred for 3 hours while the temperature was raised to room temperature. After completion of the reaction, the solvent was removed by vacuum, the mixture was dissolved in pentane and filtered to obtain the filtrate. A vacuum was applied to remove pentane to obtain a dark brown compound (3.70 g). The yield was 71.3%.

$^1$H NMR (C$_6$D$_6$): δ 0.59 (s, 6H, Ti—CH$_3$), 1.66 (s, 6H, Cp-CH$_3$), 1.69 (br t, J=6.4 Hz, 2H, quin-CH$_2$), 2.05 (s, 6H, Cp-CH$_3$), 2.47 (t, J=6.0 Hz, 2H, quin-CH$_2$), 4.53 (m, 2H, quin-CH$_2$), 6.84 (t, J=7.2 Hz, 1H, quin-CH), 6.93 (d, J=7.6 Hz, quin-CH), 7.01 (d, J=6.8 Hz, quin-CH) ppm $^{13}$C NMR (C$_6$D$_6$): δ 12.12, 23.08, 27.30, 48.84, 51.01, 119.70, 119.96, 120.95, 126.99, 128.73, 131.67, 136.21 ppm Preparation Example 2: Preparation of Transition Metal Compound 2

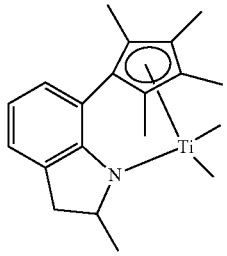

(1) Preparation of 2-methyl-7-(2,3,4,5-tetramethyl-1,3-cyclopentadienyl) indoline 2-methyl-7-(2,3,4,5-tetramethyl-1,3-cyclopentadienyl) indoline was prepared in the same manner as in (1) of Preparation Example 1 except that 2-methylindoline was used instead of 1,2,3,4-tetrahydroquinoline in (1)(i) of Preparation Example 1. The yield was 19%.

$^1$H NMR (C$_6$D$_6$): δ 6.97 (d, J=7.2 Hz, 1H, CH), δ 6.78 (d, J=8 Hz, 1H, CH), δ 6.67 (t, J=7.4 Hz, 1H, CH), δ 3.94 (m, 1H, quinoline-CH), δ 3.51 (br s, 1H, NH), δ 3.24-3.08 (m, 2H, quinoline-CH$_2$, Cp-CH), δ 2.65 (m, 1H, quinoline-CH$_2$), δ 1.89 (s, 3H, Cp-CH$_3$), δ 1.84 (s, 3H, Cp-CH$_3$), δ 1.82 (s, 3H, Cp-CH$_3$), δ 1.13 (d, J=6 Hz, 3H, quinoline-CH$_3$), δ 0.93 (3H, Cp-CH$_3$) ppm.

(2) Preparation of [(2-methylindolin-7-yl)tetramethylcyclopentadienyl-eta5,kappa-N]titanium dimethyl)

(i) A di-lithium salt compound (compound 4g) in which 0.58 equivalent of diethyl ether was coordinated was obtained (1.37 g, 50%) in the same manner as in (2)(i) of Preparation Example 1 except that 2-methyl-7-(2,3,4,5-tetramethyl-1,3-cyclopentadienyl)-indoline (2.25 g, 8.88 mmol) was used instead of 8-(2,3,4,5-tetramethyl-1,3-cyclopentadienyl)-1,2,3,4-tetrahydroquinoline.

$^1$H NMR (Pyridine-d8): δ 7.22 (br s, 1H, CH), δ 7.18 (d, J=6 Hz, 1H, CH), δ 6.32 (t, 1H, CH), δ 4.61 (brs, 1H, CH), δ 3.54 (m, 1H, CH), δ 3.00 (m, 1H, CH), δ 2.35-2.12 (m, 13H, CH, Cp-CH$_3$), δ 1.39 (d, indoline-CH$_3$) ppm.

(ii) A titanium compound was prepared in the same manner as in (2) (ii) of Preparation Example 1 using the di-lithium salt compound (compound 4g) (1.37 g, 4.44 mmol) prepared in the above (i).

$^1$H NMR (C$_6$D$_6$): δ 7.01-6.96 (m, 2H, CH), δ 6.82 (t, J=7.4 Hz, 1H, CH), δ 4.96 (m, 1H, CH), δ 2.88 (m, 1H, CH), δ 2.40 (m, 1H, CH), δ 2.02 (s, 3H, Cp-CH$_3$), δ 2.01 (s, 3H, Cp-CH$_3$), δ 1.70 (s, 3H, Cp-CH$_3$), δ 1.69 (s, 3H, Cp-CH$_3$), δ 1.65 (d, J=6.4 Hz, 3H, indoline-CH$_3$), δ 0.71 (d, J=10 Hz, 6H, TiMe$_2$-CH$_3$) ppm.

Example 1

A 1.5 L-continuous process reactor was filled with a hexane solvent (7 kg/h) and 1-octene (1.15 kg/h), and a temperature at the top of the reactor was preheated to 150° C. A triisobutyl aluminum compound (0.06 mmol/min), a mixture (0.53 µmol/min) of a transition metal compound obtained by mixing the transition metal compound 1 obtained in Preparation Example 1 and the transition metal compound 2 obtained in Preparation Example 2 in a molar ratio of 1:5, and a dimethylanilinium tetrakis(pentafluorophenyl) borate cocatalyst (1.59 µmol/min) were simultaneously introduced into the reactor. Subsequently, ethylene (0.87 kg/h) was then fed into the reactor, and the copolymerization reaction was continued at 150° C. for 30 minutes or more in a continuous process at a pressure of 89 bar to obtain a copolymer. After drying for more than 12 hours in a vacuum oven, the physical properties were measured.

Examples 2 to 5

The copolymerization reaction was carried out by using the same method as in Example 1 to obtain a copolymer except that the reaction temperature and the amount of the reaction material were changed as shown in the following Table 1.

Comparative Example 1

EG8150 manufactured by the Dow Chemical Company was purchased and used.

Comparative Example 2

The copolymerization reaction was carried out by using the same method as in Example 1 to obtain a copolymer except that only the transition metal compound 2 was used as a catalyst.

Comparative Examples 3 and 4

The copolymerization reaction was carried out using the two transition metal catalysts as in Example 1. The ratio of the two transition metals, the ratio of the catalyst to the cocatalyst, the reaction temperature and the amount of the comonomer were changed as shown in the following Table 1. The reaction proceeded to obtain a copolymer.

TABLE 1

| | Catalyst ratio (Transition metal compound 1:2) | Catalyst (µmol/min) | Cocatalyst (µmol/min) | TiBAl (mmol/min) | Ethylene (kg/h) | 1-octene (kg/h) | Reaction on temperature (° C.) |
|---|---|---|---|---|---|---|---|
| Example 1 | 1:5 | 0.53 | 1.59 | 0.06 | 0.87 | 7.0 | 150 |
| Example 2 | 1:5 | 0.53 | 1.59 | 0.06 | 0.87 | 7.0 | 146 |
| Example 3 | 1:5 | 0.70 | 2.10 | 0.06 | 0.87 | 7.0 | 150 |
| Example 4 | 1:5 | 0.43 | 1.50 | 0.06 | 0.87 | 7.0 | 146 |
| Example 5 | 1:5 | 0.73 | 1.59 | 0.06 | 0.87 | 7.0 | 150 |
| Comparative | 0:1 | 0.7 | 2.1 | 0.09 | 0.87 | 7.0 | 149 |

TABLE 1-continued

| | Catalyst ratio (Transition metal compound 1:2) | Catalyst (μmol/min) | Cocatalyst (μmol/min) | TiBAl (mmol/min) | Ethylene (kg/h) | 1-octene (kg/h) | Reaction on temperature (° C.) |
|---|---|---|---|---|---|---|---|
| Example 2 | | | | | | | |
| Comparative Example 3 | 1.4:1 | 0.3 | 0.9 | 0.05 | 0.87 | 7.0 | 148 |
| Comparative Example 4 | 1:3 | 0.42 | 1.26 | 0.05 | 0.87 | 7.0 | 149 |

Experimental Example 1

The physical properties of the copolymers of Examples 1 to 5 and Comparative Examples 1 to 4 were evaluated according to the following methods, and the results are shown in the following Table 2.

1) Soluble Fraction, Te (Elution Temperature), T(90), T(50)

The measurement equipment was a CFC of Polymer Char. First, a solution of the copolymer was fully dissolved in an oven at 130° C. for 60 minutes in a CFC analyzer using o-dichlorobenzene as a solvent, poured into a TREF column adjusted to 135° C., and then cooled to 95° C. and stabilized for 45 minutes. Subsequently, the temperature of the TREF column was lowered to −20° C. at a rate of 0.5° C./min, and then maintained at −20° C. for 10 minutes. Thereafter, the elution amount (mass %) was measured using an infrared spectrophotometer. Subsequently, the operation of raising the temperature of the TREF column to a predetermined temperature at a rate of 20° C./min and maintaining a temperature reached for a predetermined time (i.e., about 27 minutes) was repeated until the temperature of the TREF column reached 130° C., and the amount of eluted fraction (mass %) was measured during each temperature range.

The content of the ultra-low crystalline region means the content of the fraction eluted at −20° C. or less, and the elution temperature was measured the temperature at the highest point in peak.

2) Density of Polymer

Measurement was performed in accordance with ASTM D-792.

3) Melt Index (MI) of Polymer

Measurement was performed in accordance with ASTM D-1238 [condition E, 190° C. and a load of 2.16 kg].

4) Weight Average Molecular Weight (Mw, g/Mol) and Molecular Weight Distribution (MWD)

The number-average molecular weight (Mn) and the weight-average molecular weight (Mw) each were measured by gel permeation chromatography (GPC), and the molecular weight distribution was calculated by dividing the weight average molecular weight by the number average molecular weight.

Column: PL Olexis
  Solvent: Trichlorobenzene (TCB)
  Flow rate: 1.0 ml/min
  Concentration of specimen: 1.0 mg/ml
  Injection amount: 200 μl
  Column temperature: 160° C.
  Detector: Agilent High Temperature RI detector
  Standard: Polystyrene (Calibration using cubic function)

5) Melting Point (Tm) of Polymer

The melting point was obtained using the differential scanning calorimeter (DSC) 6000 manufactured by PerkinElmer. That is, after the temperature was increased to 200° C., the temperature was maintained at that temperature for 1 minute, then decreased to −100° C., and the temperature was increased again to obtain the top of the DSC curve as the melting point. At this time, the rate of temperature rise and fall is 10° C./min, and the melting point is obtained during the second temperature rise.

6) Measurement of Comonomer Content 50 mg of a specimen was taken and put in a vial, 1 ml of a TCE-d2 solvent was added thereto, and the specimen was completely dissolved using a heat gun and was transferred to a NMR tube. 1H NMR was measured with number of scan (ns)=2048 (3 h 30 min), and measurement temperature of 393K. In order to remove 1-octene or 1-butene which may remain in the specimen, a polymer was reprecipitated and prepared prior to conducting the NMR analysis. In detail, 1 g of the polymer was completely dissolved in chloroform at 70° C., and the polymer solution thus obtained was slowly poured into 300 ml of methanol while stirring to re-precipitate the polymer. The re-precipitated polymer was dried in vacuum at room temperature. The above-described process was repeated one more to obtain a polymer from which 1-octene and 1-butene were removed.

50 mg of the specimen of the polymer thus obtained was dissolved in 1 ml of TCE-d2 solvent. Measurement was conducted with an acquisition time of three seconds and a pulse angle of 30° for 2048 times at room temperature using a Bruker AVANCEIII 500 MHz NMR equipment. The comonomer content was calculated using integration values of ethylene, 1-butene and 1-octene peaks in a region of 0.5-1.5 ppm. The number of double bonds was calculated based on the integration value of double bonds in a region of 4.5-6.0 ppm. Macromolecules 2014, 47, 3782-3790 was referred to.

TABLE 2

| | Density (g/mL) | $MI_{2.16}$ (dg/min) | Mw (g/mol) | MWD | GPC peak count | Tm (° C.) | % [1-C8] |
|---|---|---|---|---|---|---|---|
| Example 1 | 0.871 | 0.44 | 135098 | 2.35 | 1 | 56.6 | 34.1 |
| Example 2 | 0.870 | 0.28 | 140790 | 2.33 | 1 | 56.1 | 35.3 |
| Example 3 | 0.866 | 1.23 | 112341 | 2.29 | 1 | 51.0 | 39.0 |
| Example 4 | 0.868 | 0.12 | 156116 | 2.33 | 1 | 53.6 | 37.0 |
| Example 5 | 0.874 | 3.6 | 90391 | 2.32 | 1 | 61.4 | 31.6 |
| Comparative Example 1 | 0.869 | 0.47 | 138442 | 2.18 | 1 | 60.1 | 35.7 |
| Comparative Example 2 | 0.868 | 0.54 | 128563 | 2.33 | 1 | 50.3 | 36.0 |

TABLE 2-continued

|  | Density (g/mL) | MI$_{2.16}$ (dg/min) | Mw (g/mol) | MWD | GPC peak count | Tm (° C.) | % [1-C8] |
|---|---|---|---|---|---|---|---|
| Comparative Example 3 | 0.870 | 0.50 | 126936 | 2.31 | 1 | 54.5 | 32.1 |
| Comparative Example 4 | 0.870 | 0.52 | 128420 | 2.30 | 1 | 54.7 | 32.1 |

TABLE 3

|  | CFC peak count | Crystal structure | Te (° C.) | SF (%) | T (90) (° C.) | T (50) (° C.) | T (90)-T (50) |
|---|---|---|---|---|---|---|---|
| Example 1 | 2 | multiple crystallinity | 28.5 | 0.7 | 34.5 | 27.0 | 7.5 |
| Example 2 | 2 | multiple crystallinity | 27.1 | 1.3 | 33.5 | 26.0 | 7.5 |
| Example 3 | 2 | multiple crystallinity | 22.2 | 3.1 | 28.0 | 21.5 | 6.5 |
| Example 4 | 2 | multiple crystallinity | 25.1 | 1.9 | 32.0 | 25.0 | 7.0 |
| Example 5 | 2 | multiple crystallinity | 32.1 | 0.3 | 36.5 | 30.5 | 6.0 |
| Comparative Example 1 | 1 | Single crystallinity | 29.3 | 1.0 | 34.5 | 25.0 | 9.5 |
| Comparative Example 2 | 1 | Single crystallinity | 19.9 | 0.3 | 28.5 | 19.5 | 9.0 |
| Comparative Example 3 | 2 | multiple crystallinity | 14.4 | 0.7 | 38.0 | 21.0 | 17 |
| Comparative Example 4 | 2 | multiple crystallinity | 27.4 | 1.1 | 34.5 | 25.0 | 9.5 |

Figure 2:
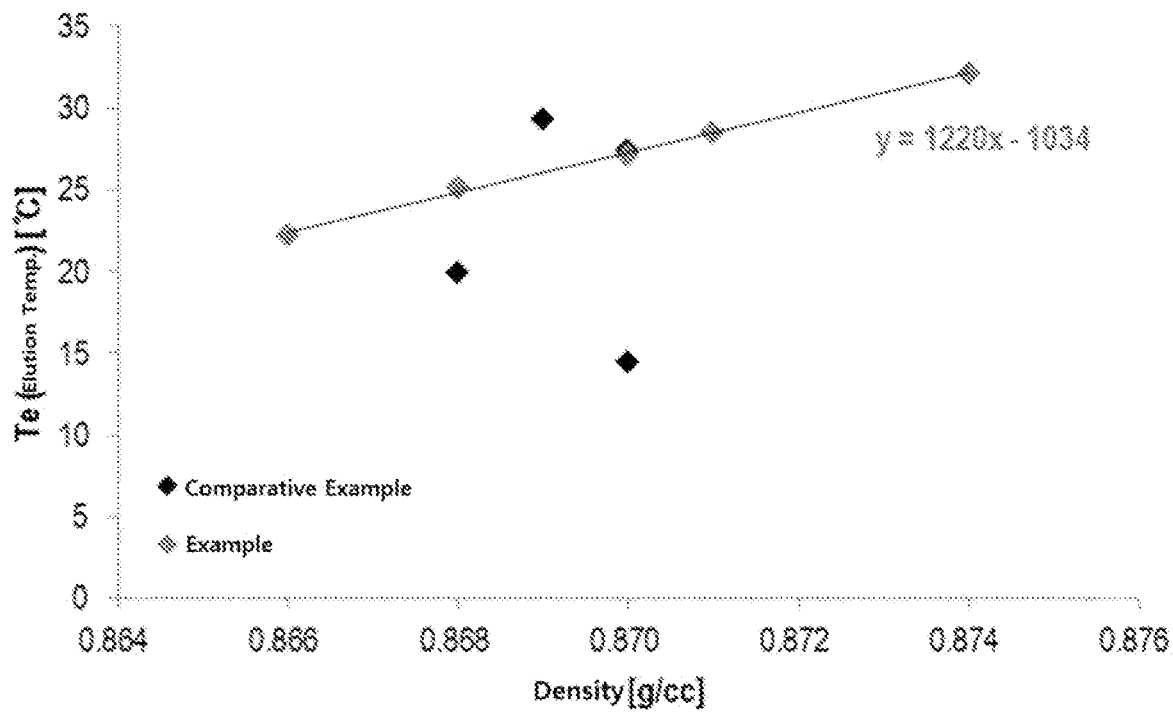
FIG. 2 is a graph shows a correlation between the density and the elution temperature (Te) of Examples 1 to 5 and Comparative Examples 1 to 4.

In addition, FIG. 1 is a graph shows CFC elution curves of Example 1 and Comparative Example 1, and FIG. 2 is a graph shows a correlation between the density and the Te (elution temperature) of Examples 1 to 5 and Comparative Examples 1 to 4. Referring to FIG. 1, Example 1 has two peaks in the CFC elution curve, and the width of the peak is narrower than that of Comparative Example 1. Since the width of the peak is narrow, as can be seen in Table 2, T(90)–T(50) is less than 8 in the Example, unlike the Comparative Example. In addition, referring to Table 1 and FIG. 2, a density and Te (elution temperature) have a linear correlation, and the correlation satisfy the Equation 1. However, Comparative Examples 1 to 3 do not satisfy the Equation 1, and Comparative Example 4 satisfies the Equation 1, but T(90)–T(50) is 8 or more.

Figure 3:
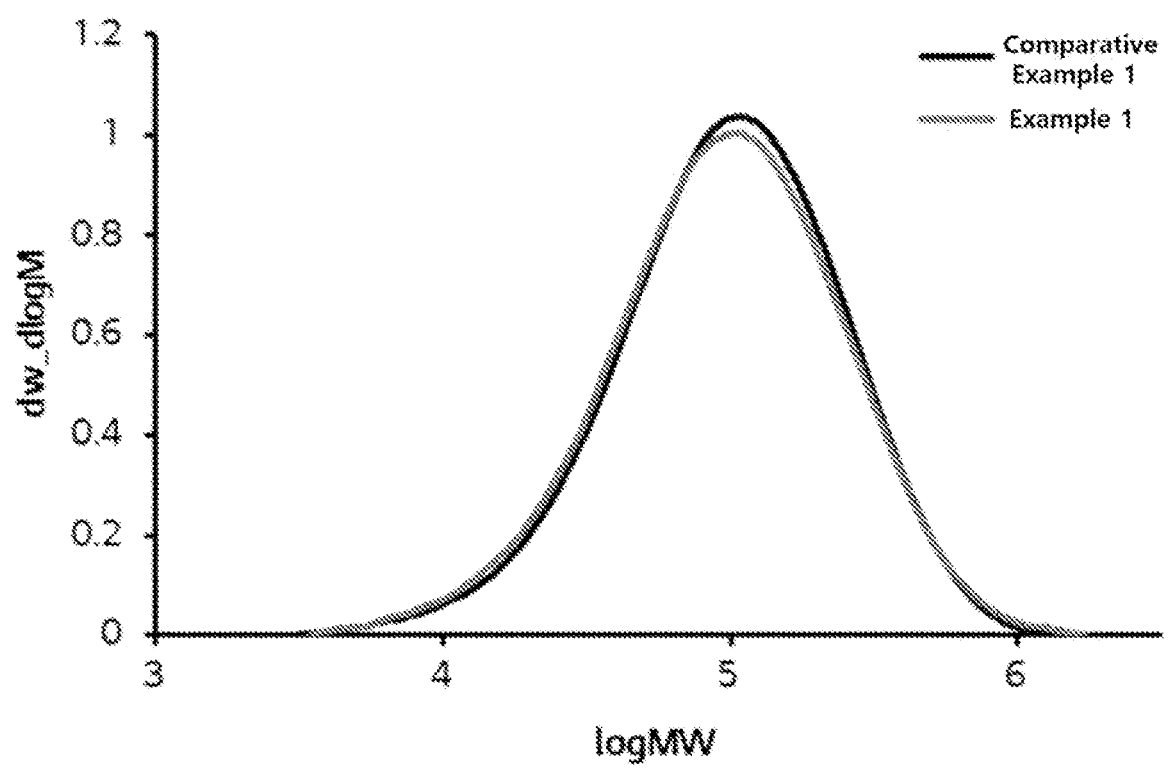
FIG. 3 is a graph shows gel permeation chromatography (GPC) molecular distribution curves of Example 1 and Comparative Example 1.

In addition, FIG. 3 is a graph shows GPC molecular distribution curves of Example 1 and Comparative Example 1. Example 1 and Comparative Example 1 have one single peak. Referring to FIG. 1 and FIG. 2, the comparative examples have a single molecular weight distribution and a single crystalline distribution, whereas the examples have a single molecular weight distribution and a multiple crystalline distribution.

Experimental Example 2

Specimens of olefin-based polymer prepared in Examples 1, and Comparative Examples 1 to 4 were prepared by injection molding at a temperature of 200° C. using an injection machine, and the specimens thus prepared were stood in a room with a constant temperature and constant humidity for one day. Then, tensile strength, tear strength, and flexural modulus were measured and are shown in Table 3 below.

1) Tensile Strength and Tear Strength of Olefin-Based Polymer

The tensile strength and tear strength were measured according to ASTM D638 using the INSTRON 3365.

2) Flexural Modulus of Olefin-Based Polymer

The flexural modulus (Secant 1%) was measured according to ASTM D790 using the INSTRON 3365.

3) Hardness (Shore A) of Olefin-Based Polymer

Hardness was measured according to ASTM D2240 using GC610 STAND for Durometer of TECLOCK Co. and a Shore hardness tester Type A of Mitutoyo Co.

TABLE 4

|  | Density (g/mL) | MI$_{2.16}$ (dg/min) | Tm (° C.) | MWD | Tensile strength (MPa) | Tear strength (kN/m) | Flexural modulus (MPa) | Hardness (Shore A) |
|---|---|---|---|---|---|---|---|---|
| Example 1 | 0.871 | 0.44 | 56.6 | 2.35 | 11.73 | 270..67 | 14.6 | 70.4 |
| Comparative Example 1 | 0.869 | 0.47 | 60.1 | 2.24 | 11.45 | 24.85 | 12.0 | 67.74 |
| Comparative Example 2 | 0.868 | 0.54 | 50.3 | 2.33 | 9.00 | 23.45 | 12.2 | 66.76 |
| Comparative Example 3 | 0.870 | 0.50 | 54.5 | 2.31 | 9.98 | 24.06 | 12.44 | 69.61 |
| Comparative Example 4 | 0.870 | 0.52 | 54.7 | 2.30 | 10.46 | 23.81 | 13.752 | 68.83 |

Referring to Table 4, it can be seen that Example 1 has improved tensile strength, tear strength, flexural modulus, and hardness compared to Comparative Examples 1 to 4 having similar density and MI.

The invention claimed is:

1. An olefin-based polymer having multiple crystallinity and satisfying the following:
 (1) two peaks in a temperature range of −20° C. to 120° C. when measured by cross-fractionation chromatography (CFC), wherein the two peaks exclude a soluble fraction (SF) at −20° C., and T(90)−T(50)<8.0° C., wherein T(90) is a temperature at which 90 wt % of the olefin-based polymer is eluted, and T(50) is a temperature at which 50 wt % of the olefin-based polymer is eluted;
 (2) 10 wt % or less of the SF at −20° C. in CFC;
 (3) 15° C.<Te<50° C., wherein elution temperature (Te) is a temperature at which a maximum in elution amount with respect to temperature (dC/dT) occurs in CFC; and (4) Te has a linear correlation with a density (d) of the olefin-based polymer, and satisfies Equation 1, $$Te = 1{,}220 \times d - A \qquad \text{[Equation 1]}$$

wherein $1{,}031 \leq A \leq 1{,}039$.

2. The olefin-based polymer according to claim 1, which has a density (d) ranging from 0.860 to 0.890 g/cc.

3. The olefin-based polymer according to claim 1, which has a density (d) ranging from 0.865 to 0.880 g/cc.

4. The olefin-based polymer according to claim 1, which has a melt index (MI, 190° C., 2.16 kg load) ranging from 0.1 g/10 min to 10.0 g/10 min.

5. The olefin-based polymer according to claim 1, which has a weight average molecular weight (Mw) in a range of 70,000 to 500,000.

6. The olefin-based polymer according to claim 1, which has a molecular weight distribution (MWD) in a range of 1.0 to 3.0.

7. The olefin-based polymer according to claim 1, which has a melt temperature (Tm) of 100° C. or less, wherein Tm is measured by differential scanning calorimetry (DSC).

8. The olefin-based polymer according to claim 1, which is a copolymer polymerized from ethylene and an alpha-olefin comonomer having 3 to 12 carbon atoms.

9. The olefin-based polymer according to claim 8, wherein the alpha-olefin comonomer comprises at least one of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, or 1-eicosene.

10. The olefin-based polymer according to claim 1, which is a copolymer polymerized from ethylene and 1-octene.

11. The olefin-based polymer according to claim 1, which has a single molecular weight distribution defined by having one peak when measured by gel permeation chromatography (GPC).

12. The olefin-based polymer according to claim 1, which is prepared by a method comprising:
polymerizing an olefin-based monomer in the presence of a catalyst composition, wherein the catalyst composition comprises a transition metal compound represented by Formula 1 and a transition metal compound represented by Formula 2 in a molar ratio of 1:5 to 1:7:

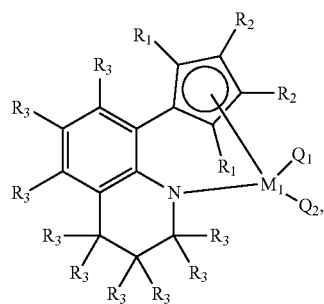

[Formula 1]

wherein, in Formula 1,
each $R_1$ is the same or different, and is independently hydrogen, an alkyl having 1 to 20 carbon atoms, an alkenyl having 2 to 20 carbon atoms, an aryl, a silyl, an alkylaryl, an arylalkyl, or a metalloid radical of a Group 4 metal substituted with a hydrocarbyl, each $R_2$ is the same or different, and is independently hydrogen, a halogen, an alkyl having 1 to 20 carbon atoms, an aryl, an alkoxy, an aryloxy, or an amido radical, and the two $R_2$ are optionally connected to each other to form an aliphatic ring or an aromatic ring, each $R_3$ is the same or different, and is independently hydrogen, a halogen, an alkyl having 1 to 20 carbon atoms, or an aliphatic or aromatic ring which contains nitrogen and is unsubstituted or substituted with an aryl radical, and the two or more $R_3$ are optionally connected to each other to form an aliphatic or aromatic ring, $M_1$ is a Group 4 transition metal, and $Q_1$ and $Q_2$ are each independently a halogen, an alkyl having 1 to 20 carbon atoms, an alkenyl, an aryl, an alkylaryl, an arylalkyl, an alkylamido having 1 to 20 carbon atoms, an arylamido, or an alkylidene radical having 1 to 20 carbon atoms,

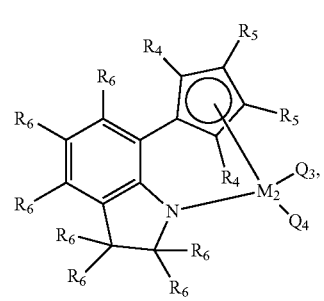

[Formula 2]

wherein, in Formula 2,
each $R_4$ is the same or different, and is independently hydrogen, an alkyl having 1 to 20 carbon atoms, an alkenyl having 2 to 20 carbon atoms, an aryl, a silyl, an alkylaryl, an arylalkyl, or a metalloid radical of a Group 4 metal substituted with a hydrocarbyl, each $R_5$ is the same or different, and is independently hydrogen, a halogen, an alkyl having 1 to 20 carbon atoms, an aryl, an alkoxy, an aryloxy, or an amido radical, and the two $R_5$ are optionally connected to each other to form an aliphatic ring or an aromatic ring, each $R_6$ is the same or different, and is independently hydrogen, a halogen, an alkyl having 1 to 20 carbon atoms, or an aliphatic or aromatic ring which contains nitrogen and is unsubstituted or substituted with an aryl radical, and two or more $R_6$ are optionally connected to each other to form an aliphatic or aromatic ring, $M_2$ is a Group 4 transition metal, and $Q_3$ and $Q_4$ are each independently a halogen, an alkyl having 1 to 20 carbon atoms, an alkenyl, an aryl, an alkylaryl, an arylalkyl, an alkylamido having 1 to 20 carbon atoms, an arylamido, or an alkylidene radical having 1 to 20 carbon atoms.

13. The olefin-based polymer according to claim 12, which is prepared by a continuous solution polymerization reaction in a continuous stirred tank reactor in the presence of the catalyst composition.

* * * * *